US008930989B2

(12) United States Patent
Knoller et al.

(10) Patent No.: US 8,930,989 B2
(45) Date of Patent: Jan. 6, 2015

(54) SYSTEM AND METHOD FOR PROVIDING SUPERVISED LEARNING TO ASSOCIATE PROFILES IN VIDEO AUDIENCES

(75) Inventors: Raviv Knoller, Shoham (IL); Alex Paker, Modin (IL); Anna Litvak-Hinenzon, Hod-HaSharon (IL); Reuven Cohen, Rehovot (IL)

(73) Assignee: AdsVantage, Shoham (IL)

( * ) Notice: Subject to any disclaimer, the term of this patent is extended or adjusted under 35 U.S.C. 154(b) by 190 days.

(21) Appl. No.: 12/054,937

(22) Filed: Mar. 25, 2008

(65) Prior Publication Data
US 2009/0055858 A1 Feb. 26, 2009

Related U.S. Application Data

(60) Provisional application No. 60/956,728, filed on Aug. 20, 2007.

(51) Int. Cl.
| | |
|---|---|
| H04H 60/33 | (2008.01) |
| H04N 7/10 | (2006.01) |
| H04H 60/32 | (2008.01) |
| H04N 7/025 | (2006.01) |
| H04N 5/445 | (2011.01) |
| G06F 3/00 | (2006.01) |
| G06F 13/00 | (2006.01) |
| H04N 21/2665 | (2011.01) |
| G06Q 30/02 | (2012.01) |
| G06Q 30/04 | (2012.01) |
| G06Q 30/06 | (2012.01) |
| H04N 7/173 | (2011.01) |
| H04N 21/234 | (2011.01) |
| H04N 21/25 | (2011.01) |
| H04N 21/442 | (2011.01) |
| H04N 21/6405 | (2011.01) |
| H04N 21/81 | (2011.01) |

(52) U.S. Cl.
CPC .......... *H04N 21/2665* (2013.01); *G06Q 30/02* (2013.01); *G06Q 30/0264* (2013.01); *G06Q 30/04* (2013.01); *G06Q 30/0601* (2013.01); *H04N 7/17318* (2013.01); *H04N 21/23424* (2013.01); *H04N 21/252* (2013.01); *H04N 21/44222* (2013.01); *H04N 21/6405* (2013.01); *H04N 21/812* (2013.01)
USPC ............... 725/34; 725/9; 725/14; 725/46

(58) Field of Classification Search
CPC .......... H04N 21/252; H04N 21/25883; H04N 21/25891; H04N 21/44222; H04N 21/441; H04N 21/4532; H04N 21/466; H04N 21/4661
USPC .......... 705/1, 7, 10, 14; 725/9, 10, 42, 46, 11, 725/13, 14, 16, 20, 34–36, 61, 105, 135
See application file for complete search history.

(56) References Cited

U.S. PATENT DOCUMENTS

| | | | |
|---|---|---|---|
| 5,661,516 A | * | 8/1997 | Carles ........................... 725/35 |
| 6,216,129 B1 | | 4/2001 | Eldering |

(Continued)

*Primary Examiner* — Hai V Tran
(74) *Attorney, Agent, or Firm* — Peter A. Nieves; Sheehan Phinney Bass + Green PA

(57) ABSTRACT

A system and method for providing supervised learning to associate profiles in video audiences is provided. The method includes: receiving data providing an association of consumer profiles and video decoders to households within a network; recording zapping events (patterns) created by consumers; and associating zapping patterns of consumers with households. The step of associating further includes: collecting external data and converting a format of the external data into an internal format; converting zapping logs into different data models that can be used to provide set top box signatures; providing the set top box signatures; using the set top box signatures with a list of set top boxes and profiles to provide an association rule; and applying the association rule to the set top box signatures to determine a list of profiles of the consumer profiles associated with a specific set top box of the set top boxes.

29 Claims, 8 Drawing Sheets

(56) References Cited

U.S. PATENT DOCUMENTS

| | | |
|---|---|---|
| 6,324,519 B1 | 11/2001 | Eldering |
| 6,457,010 B1 * | 9/2002 | Eldering et al. ............... 725/14 |
| 6,684,194 B1 * | 1/2004 | Eldering et al. ............... 725/10 |
| 7,139,723 B2 | 11/2006 | Conkwright et al. |
| 7,146,329 B2 | 12/2006 | Conkwright et al. |
| 7,197,472 B2 | 3/2007 | Conkwright et al. |
| 7,236,941 B2 | 6/2007 | Conkwright et al. |
| 7,302,419 B2 | 11/2007 | Conkwright et al. |
| 8,046,798 B1 * | 10/2011 | Schlack et al. ............... 725/46 |
| 2002/0104083 A1 | 8/2002 | Hendricks et al. |
| 2002/0129368 A1 | 9/2002 | Schlack et al. |
| 2003/0004966 A1 | 1/2003 | Bolle et al. |
| 2003/0055759 A1 | 3/2003 | Conkwright et al. |
| 2003/0093792 A1 | 5/2003 | Labeeb et al. |
| 2003/0110109 A1 | 6/2003 | Conkwright et al. |
| 2003/0145323 A1 | 7/2003 | Hendricks et al. |
| 2003/0172374 A1 | 9/2003 | Vinson et al. |
| 2004/0078809 A1 | 4/2004 | Drazin |
| 2004/0163101 A1 | 8/2004 | Swix et al. |
| 2004/0230546 A1 | 11/2004 | Rogers |
| 2005/0137958 A1 | 6/2005 | Huber et al. |
| 2007/0033105 A1 | 2/2007 | Collins et al. |
| 2007/0053513 A1 | 3/2007 | Hoffberg |
| 2007/0064943 A1 | 3/2007 | Ginter et al. |
| 2007/0078849 A1 | 4/2007 | Slothouber |
| 2007/0136753 A1 | 6/2007 | Bovenschulte et al. |
| 2007/0162342 A1 | 7/2007 | Klopf |
| 2007/0186243 A1 | 8/2007 | Pettit et al. |
| 2007/0220575 A1 | 9/2007 | Cooper et al. |
| 2007/0240181 A1 * | 10/2007 | Eldering et al. ............... 725/14 |
| 2007/0271145 A1 | 11/2007 | Vest |
| 2007/0288953 A1 | 12/2007 | Sheeman et al. |
| 2008/0077951 A1 | 3/2008 | Maggio |
| 2008/0109849 A1 * | 5/2008 | Wang ............... 725/46 |
| 2008/0244665 A1 | 10/2008 | Bowen et al. |
| 2008/0271070 A1 | 10/2008 | Kanojia et al. |
| 2009/0055268 A1 | 2/2009 | Knoller et al. |
| 2009/0055859 A1 | 2/2009 | Knoller et al. |
| 2009/0055860 A1 | 2/2009 | Knoller et al. |
| 2009/0055861 A1 | 2/2009 | Knoller et al. |
| 2009/0055862 A1 | 2/2009 | Knoller et al. |

* cited by examiner

SYSTEM AND METHOD FOR PROVIDING SUPERVISED LEARNING TO ASSOCIATE PROFILES IN VIDEO AUDIENCES

CROSS-REFERENCE TO RELATED APPLICATIONS

This application claims priority to U.S. Provisional Application entitled, "SYSTEM AND METHOD FOR PROVIDING PERSONAL ADVERTISEMENTS FOR AN ACCESS NETWORK," having Ser. No. 60/956,728, filed Aug. 20, 2007, which is entirely incorporated herein by reference.

FIELD OF THE INVENTION

The present invention relates to advertising, and more particularly is related to providing personal advertisement to video services.

BACKGROUND OF THE INVENTION

Owners of products and services, also referred to herein as advertisers, spend significant funds advertising on television. In addition, advertisers seek to maximize return from their investment in advertising on television by using different techniques. As an example, owners may pay to have an advertisement run at a specific time on a specific channel. Such an advertisement may not only be for products and services, but for any content, such as, but not limited to, video on demand, gaming, and any other content or service. In addition, owners may pay a premium price to have their advertisement run during the showing of popular television programming.

Unfortunately, advertisers do not have control over who may be watching television at a time that an advertisement is run. As a result, funds associated with television advertising are not maximized. Instead, after receiving ratings associated with an aired television show, advertisers pay based upon a previously desired audience and an agreed upon percentage. Funds would be better allocated if a larger number of a specific desired audience could be selected for viewing of targeted advertisements.

Different techniques have been used in an attempt to maximize television advertising investments. Examples of known techniques include attempting to obtain demographic and psychographic profiles, and using information about rating. Unfortunately, information about rating, demographic and psychographic profiles, and targeted rating is obtained using surveys and/or people meters, which are based on small sample audiences and are inaccurate in the collection process. Advertisers, network management, and cable/satellite decision makers would like to use more accurate information for placement and pricing of television advertisements.

Currently, the process of creating television viewer profiles has not made use of the actual actions of the television viewers while watching television. Utilizing information associated with viewer actions while watching television would be very useful in the creating of television viewer profiles.

Thus, a heretofore unaddressed need exists in the industry to address the aforementioned deficiencies and inadequacies.

SUMMARY OF THE INVENTION

Embodiments of the present invention provide a system and method for providing supervised learning to associate profiles in video audiences. Briefly described, in architecture, one embodiment of the system, among others, can be implemented as follows. The system contains a head end having a computer and means for communicating therein, wherein the computer has a management application stored therein, and wherein the management application further comprises: logic configured to receive data providing an association of consumer profiles and video decoders to households within a network; and logic configured to associate zapping patterns of consumers with households. The management application also contains: logic configured to convert a format of external data into an internal format; logic configured to convert zapping logs into different data models that can be used to provide set top box signatures; logic configured to provide the set top box signatures; logic configured to use the set top box signatures with a list of set top boxes and profiles to provide an association rule; and logic configured to apply the association rule to the set top box signatures to determine a list of profiles of the consumer profiles associated with a specific set top box of the set top boxes.

The present invention can also be viewed as providing methods for providing supervised learning to associate profiles in video audiences. In this regard, one embodiment of such a method, among others, can be broadly summarized by the following steps: receiving data providing an association of consumer profiles and video decoders to households within a network; recording zapping events created by consumers, also referred to as the zapping patterns of the consumers; and associating the zapping patterns of the consumers with households.

The step of associating the zapping patterns of the consumers with households further comprises the steps of: collecting external data and converting a format of the external data into an internal format; converting zapping logs into different data models that can be used to provide set top box signatures; providing the set top box signatures; using the set top box signatures with a list of set top boxes and profiles to provide an association rule; and applying the association rule to the set top box signatures to determine a list of profiles of the consumer profiles associated with a specific set top box of the set top boxes.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
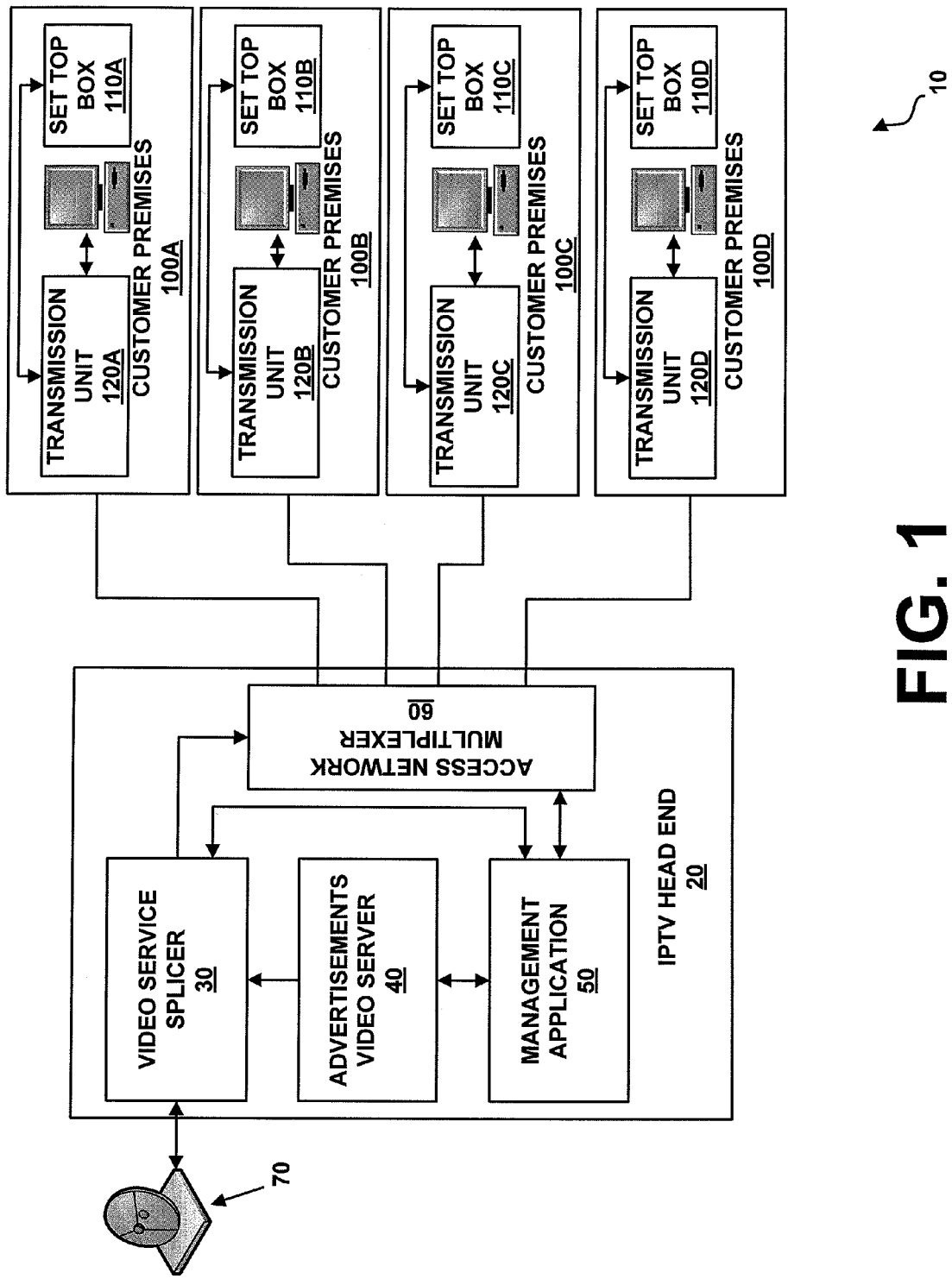
FIG. 1 is a schematic diagram illustrating an example of an IPTV network in which the present system may be provided.

The present system is capable of learning the viewing habits of video viewers by collecting zapping events and other events performed by the viewer. Such videos may be viewed via a television, hand held device, computer, or any device capable of displaying video. The events may be collected at a set top box, computer, or other device. Alternatively, the events may be collected at a different location, such as, but not limited to, at an access multiplexer located in a head end, or in a device located separate from the head end. The system learns the viewing habits and zapping habits of different population profiles by identifying the viewing profile of a household.

The system uses supervised or unsupervised learning functionality for identifying different population profiles, and provides a representation of the probability (or another form of representation) of each population profile to watch any given program and to present a zapping pattern. The probabilities can be utilized as a tool for advertisers searching for the demographic profile of the audience of a television program, or, using inference functionality described herein, to identify the home audience at each household, and the specific viewers of a television program. Thereafter, the system is capable of supplying personalized content, such as, but not limited to, advertisements, video selections, and other content, to the viewers. It should be noted that the following description provides an example in which the content is an advertisement, however, the invention is not intended to be limited to advertisements, but instead, any content that may be personalized.

The present system collects the operations performed by viewers at service decoders, such as, but not limited to, set top boxes (the term set top box is used hereafter). The system then employs unsupervised or supervised learning functionality, as described herein, to interpret the operations at each set top box as the sum of operations of all viewers associated with this set top box. The system learns to identify different viewer profiles in the population and associates with each set top box and profile a probabilistic model of the viewing and zapping habits of viewers.

It should be noted that the present system and method may be provided within different infrastructures. As an example, the following descriptions provides examples of using the present system and method in an Internet protocol television (IPTV) infrastructure, in a cable infrastructure, and in a satellite infrastructure. While these infrastructures are described herein, the present system and method is not intended to be limited to these infrastructures.

While the following describes the present system and method in detail it is beneficial to provide certain definitions.

Set top box (STB) or service decoder: A set top box or service decoder is a device responsible for converting digital (or analog) content received into viewable content that may be fed into a television set or other monitor. The set top box or service decoder may be located at a household or another location.

Platform: A network of service decoders (e.g., set top boxes) of a specific television service provider.

Passive audience identification: Identification of the viewer's profiles without any specific actions performed by the viewer.

Zapping event: A zapping event is an event where there is switching from a current service to another service, where the switching is performed by, for example, but not limited to, use of a remote control, pushing buttons on the set top box, or any action that causes switching. In addition, a zapping event may be other means for communicating with a set top box, such as, but not limited to, pressing an electronic program guide, pressing a volume button, and other actions involving the set top box.

Zapping pattern: A zapping pattern is the behavior of a viewing individual in terms of zapping, such as, but not limited to, programs watched, frequency of zapping events, and variance of zapping frequency.

Set top box (STB) zapping signature: A set of zapping events of a particular STB.

Zapping log: Records of the STB zapping signatures for an entire STB network (Platform) or for part of the network.

Channel: A stream of programs broadcasted consecutively from a content source.

Program: Content that was broadcasted on a specific channel at a specific date and time.

Program Rating: Percent of viewers that watched the program.

Targeted program rating: Percent of viewers of specific profile that watched the program.

Channel Rating: Percent of viewers that watched the channel during the specified time period.

Targeted Channel Rating: Percent of viewers of specific Profile that watched the channel during the specified time period.

Profile: A profile is the classification of an individual into one of several population groups targeted by advertisers. Such profiles may be, for example, but not limited to, behavioral and demographical profiles. Examples of such groups include, but are not limited to, gender, age, income, marital status, and possibly also by interests in different fields.

Learning functionality: Learning functionality is functionality used to reduce a large set of observed data and its classification into groups to a set of parameters, allowing to reconstruct the classification of the majority of the original data and to classify similar, unlearned, data. Different relevant learning methods may be utilized to provide the learning functionality such as, but not limited to, artificial neural networks, decision trees, k-Nearest Neighbor, Quadratic classifier, support vector machine, direct probability estimate using Bayesian inference, Bayesian networks, Gaussian estimators, least squares optimization methods, and other optimization methods.

Supervised learning: Supervised learning is learning in which the classification of the observed data is inferred from a sample of the data supplied by an outside source. The learning functionality searches for a parameter set allowing reconstruction of the classification from the input that later can be used for classification of new unlearned data.

Unsupervised learning: Unsupervised learning is learning in which no classification of observed data is given (i.e., no sample is provided), and the functionality attempts to classify the data into different classes under some constraints. The functionality may use a method, such as, but not limited to, vector quantization, and various learning methods and various optimization methods, to find a reduction of the data into representative classes.

FIG. 1 is a schematic diagram illustrating an example of an IPTV network 10 in which the present system may be provided. Specifically, FIG. 1 is specific to video on demand or personalized advertisements for an IPTV infrastructure. As shown by FIG. 1, an IPTV head end 20 is provided, portions of which communicate with at least one customer premises 100A-100D. As is known by those having ordinary skill in the art, a head end is the physical location in an area where a video signal is received by a provider, stored, processed, and transmitted to local customers of the provider.

The head end 20 contains at least a video service splicer 30, an advertisements video server 40, a management application 50, and an access network multiplexer 60. One having ordinary skill in the art would appreciate that the head end 20 may have portions in addition to those mentioned herein. In addition, while the present description refers to a management application, it should be noted that the management application is stored on a computer.

The video service splicer 30 receives video and audio services from a satellite dish 70. It should, however, be noted that video and audio services may be received by devices other than a satellite dish 70, such as, but not limited to, a cable network or any device capable of providing video to the head end 20.

The video service splicer 30 is capable of splicing personal advertisements into a video service stream, as instructed by the management application 50 and as is further described in detail hereinbelow. The video service splicer 30 also receives advertisements from the advertisements video server 40. In addition, actions of the video service splicer 30 are controlled by the management application 50. It should be noted that the video packets received by the video service splicer 30 preferably carry an Internet protocol (IP) address and a User Datagram Protocol (UDP) port number. It should also be noted that the video service splicer 30 may instead receive video and audio services from a cable fiber.

The access network multiplexer 60 is responsible for routing video services to transmission units 120A-120D that are video services decoders, as explained hereinbelow. The transmission units 120 are each located within a customer premises 100A-100D. The access multiplexer 60 is connected to both the management application 50 and the video service splicer 30. Specifically, the access network multiplexer 60 may perform, for example, IP and UDP port manipulation. It should be noted that the access network multiplexer 60 may be, for example, but not limited to, an optic multiplexer or a digital subscriber line access multiplexer (DSLAM). From a multicast point of view, as described hereinbelow, connection between the access network multiplexer 60 and a set top box 110 may be a shared media connection, or any other type of connection, and there may or may not be a multicast hierarchy between the access network multiplexer 60 and the set top box 110.

The management application 50 communicates with the video service splicer 30, the advertisements video server 40, and the access network multiplexer 60. In addition, the management application 50 provides the functionality required to learn unsupervised profiles in television audiences, as is described in detail hereinbelow. It should be noted that in accordance with an alternative embodiment of the invention, the management application 50 may instead be located within a set top box 110 located within the customer premises 100A-100D.

Each customer premises 100A-100D at least contains a set top box 110A-110D and a transmission unit 120A-120D. While for exemplary purposes four customer premises 100A-100D are illustrated, one having ordinary skill in the art would appreciate that additional or fewer customer premises 100A-100D may be provided. The transmission unit 120 is capable of receiving advertisement streams and video streams and forwarding the streams to an appropriate set top box 110. For exemplary purposes, the customer premises 100A-100D is illustrated as also containing a computer 130A-130D, although a computer 130 is not intricate to the invention. It should be noted that while a single set top box is shown as being located within a customer premises 100, more than one set top box 110 may be located within the customer premises 100. In addition, in accordance with an alternative embodiment of the invention, the set top box may be a computer or any device that can decode a service. For the present example of an IPTV network, the set top box 110 receives a video service with certain TCP/IP parameters, such as, but not limited to, IP address and UDP port. It should be noted, however, that in a cable network or a satellite network, the set top box 110 may not receive TCP/IP parameters.

The present system enables editing of online personal video so as to provide personalized television advertisements directed toward a viewer presently watching the television. As is described in detail below, the present invention is capable of categorizing a viewer into an advertising profile, an example of which is, but in not limited to, a demographic profile. Within a single customer premises, different television viewers may have different profiles. The different television viewers may view the same television during the day. Each different viewer may be associated with a different advertising profile, such as, but not limited to a demographic profile, thus preferably receiving different advertising messages. As an example, a family structure may be described as having an adult male of age 45, an adult female of age 42, a male teenager of age 17, a female teenager of age 14, and a male child of age 7. It should be noted that while the present description refers to a demographic profile, other types of profiles may be provided for.

During the time that a television viewer consumes service transmissions the management application 50 identifies the profile of the viewer. After identifying the profile, the application 50 performs personalized advertisements editing for that particular profile. When there is a different viewer with a different advertising profile that is using the same video decoder, the management application 50 identifies the profile that the viewer belongs to and performs online personalization editing for the advertisements, as described below.

In accordance with the present invention, for both supervised and unsupervised learning, the television consumers, also referred to herein as viewers, are not individually identifying themselves to the system. As a result, the system is required to identify consumer profiles and to associate the profiles with a specific set top box. This process is described in detail hereinbelow. Prior to describing this process, a general process of IPTV advertisement insertion in a broadcast environment is described in detail.

A typical advertisement projection works as follows. During content consumption the access network multiplexer 60 receives a video signal and sends the video signal to the customer premises 100A-100D using an IP protocol. During an advertisement break the video transmissions continue to be transmitted in multicast, thus there is no personalization of advertisements. To instead personalize advertisements, the following is performed.

Figure 2:
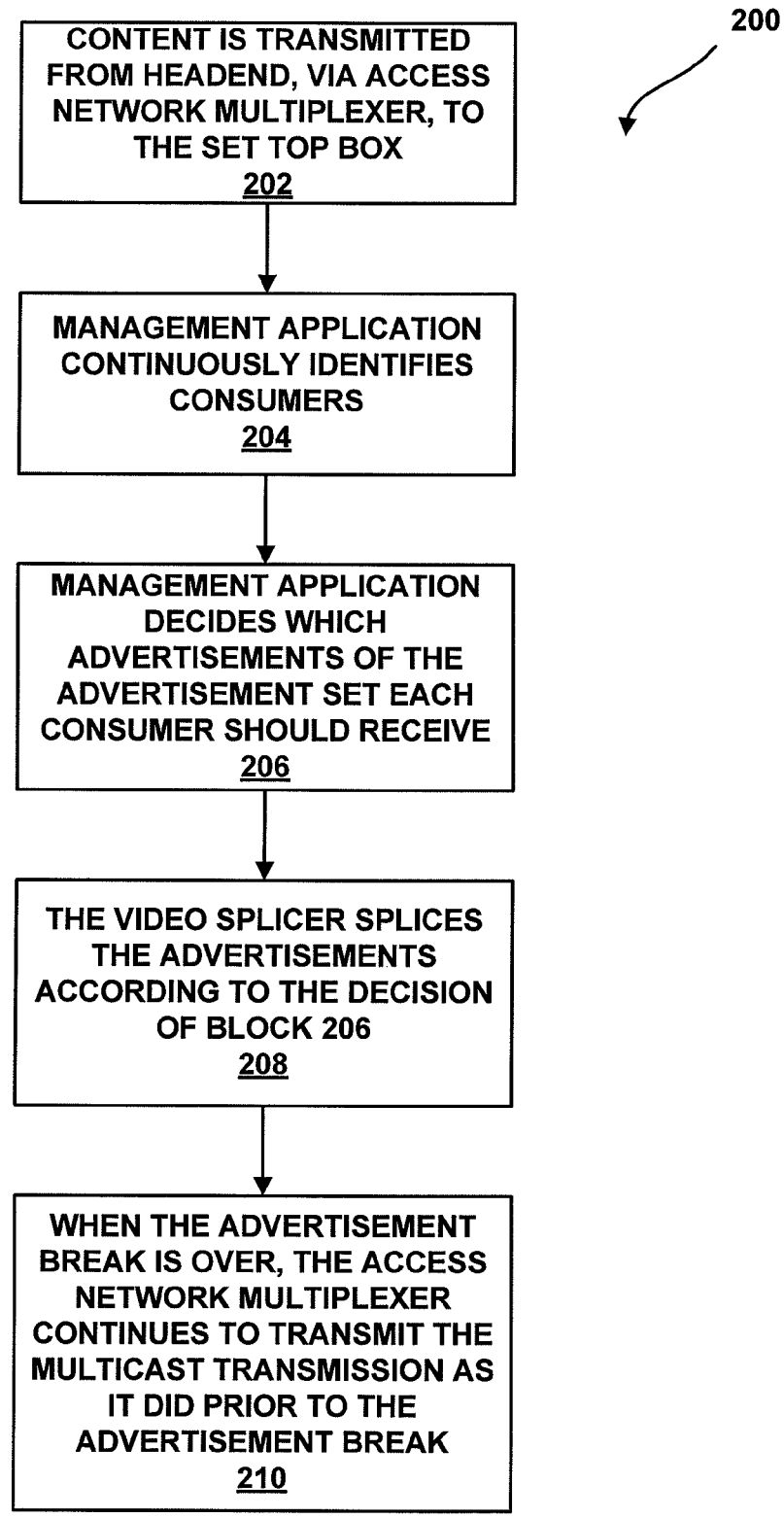
FIG. 2 is a flow chart further illustrating the process of personalizing advertisements, in accordance with one exemplary embodiment of the invention.

FIG. 2 is a flow chart 200 further illustrating the process of personalizing advertisements, in accordance with one exemplary embodiment of the invention. Any process descriptions or blocks in flow charts should be understood as representing modules, segments, or portions of code which include one or more executable instructions for implementing specific logical functions or steps in the process, and alternative implementations are included within the scope of the embodiment of the present invention in which functions may be executed out of order from that shown or discussed, including substantially concurrently or in reverse order, depending on the functionality involved, as would be understood by those reasonably skilled in the art of the present invention.

As shown by block 202, content is transmitted from the head end 20, via the access network multiplexer 60, to the set top box 110. An example of a protocol that may be used for the transmission is the Internet group management protocol (IGMP), which is used by IP hosts to manage their dynamic multicast group membership. Of course, other protocols may be used.

In accordance with the present example, a subset, or complete set, of the customers that are connected to the access network multiplexer 60 are viewing the same video and/or audio service (i.e., content). The management application 50 also continuously identifies the consumers (block 204). It should be noted that the management application 50 can utilize either online processing or offline processing to determine a relationship between viewed content (e.g., videos) and viewer profiles. Regarding offline processing to identify consumers, associate the consumers with content, and produce reports, in accordance with a predefined schedule, or when prompted to do so, the management application 50 reviews zapping patterns, processes the patterns, and associates each program viewed from a set top box with a viewer profile. Alternatively, for online processing, during an advertising break, the management application 50 reviews only recent zapping events to determine which viewer is presently viewing content. Further description of consumer identification is provided with regard to FIG. 3. It should be noted that the information received by the management application 50 may be received from a source other than a set top box.

Returning to the flowchart 200 of FIG. 2, the management application 50 decides which advertisements of the advertisement set each consumer should receive (block 206). It should be noted that the process of selecting advertisements is described in detail herein.

As shown by block 208, the video splicer 30 then splices the advertisements according to the decision of block 206. Since one having ordinary skill in the art would know how a video splicer splices advertisements, further description of the splicing process is not provided herein. As shown by block 210, when the advertisement break is over, the access multiplexer 60 continues to transmit the multicast transmission as it did prior to the advertisement break.

It should be noted that if during an advertisement break the consumer changes the consumed video service, the management application 50 supplies the new service in the same manner. Specifically, if the service transmits content, the management application 50 continues to transmit the content with the multicast protocol. In addition, if there is an advertisement break, the management application 50 may splice different advertisements.

As previously mentioned, the present system provides a consumer specific advertising environment. This environment is provided in part by the providing of online multilayer multicast groups between the access network multiplexer 60 and the set top boxes 110A-110D. The access network multiplexer 60 transmits broadcast transmissions with multicast protocol to a subset A of the set that is connected to the access network multiplexer 60. In the subset A there are different subsets B of consumers watching the same channel at a given moment that are connected to the access network multiplexer 60. Within a single subset B, consumers are associated by their profile for advertising. When there is an advertisement break, the access network multiplexer 60 is transmitting an additional layer of multicast, where each different subset Bi is receiving different advertisements according to the advertisement profile associated with subset Bi. Finally, when the advertisement break is over, subset A consumers continue to watch the same service.

Figure 4:
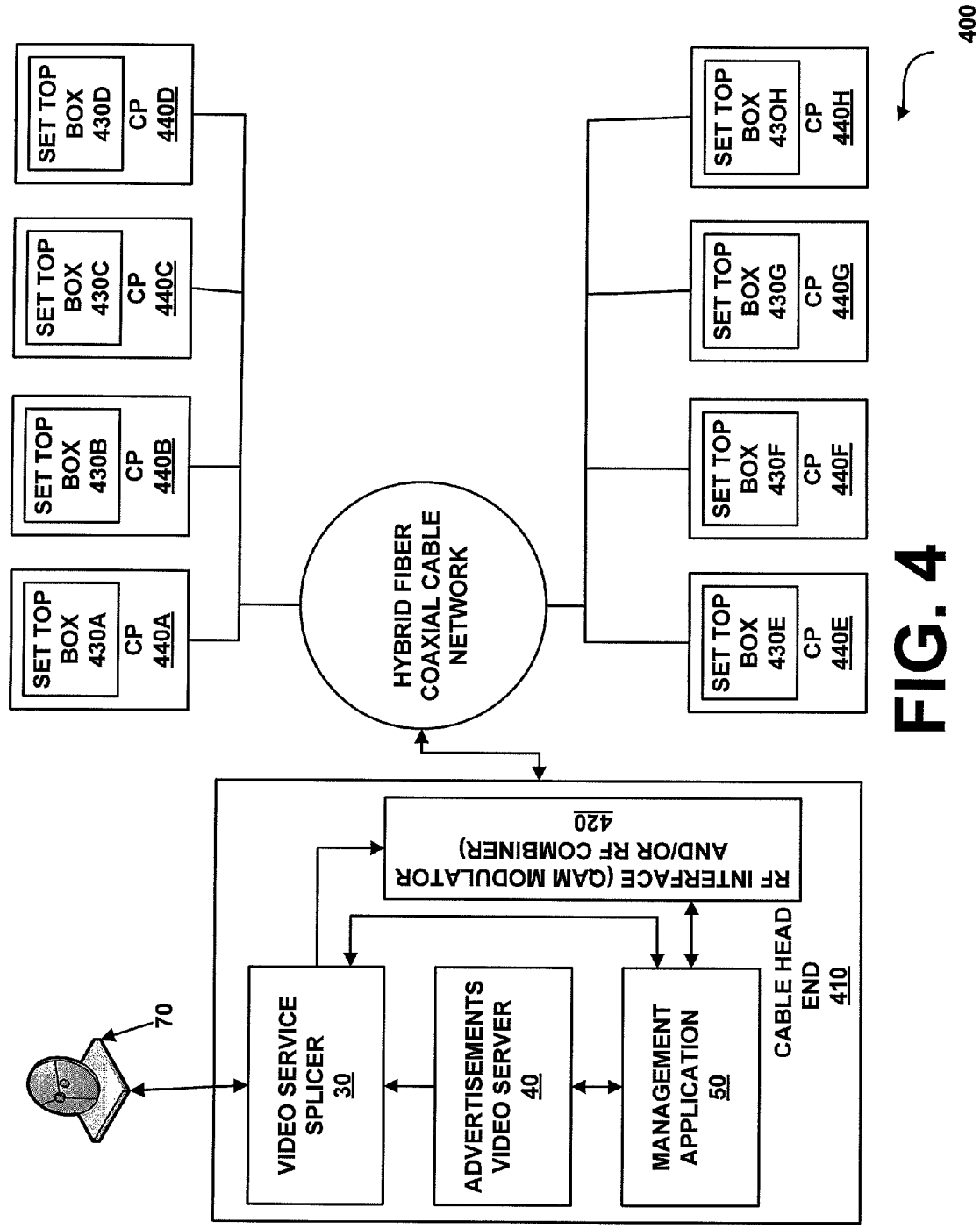
FIG. 4 is a schematic diagram illustrating an example of a cable network in which the present system may be provided.

While the abovementioned provides an example of an IPTV network 10, a different infrastructure in which the present system and method may be provided includes a cable network 400. FIG. 4 is a schematic diagram illustrating an example of a cable network 10 in which the present system may be provided. While there are similarities between the IPTV network of FIG. 1 and the cable network 400 of FIG. 4, there are also differences, which are described herein.

Referring the FIG. 4, a cable head end 410 of the cable network 400 is very similar to the IPTV head end 20 of the IPTV network 10. It should be noted, however, that instead of an access network multiplexer 60, the cable network 400 contains an RF interface 410, which may be, for example, but not limited to, a QAM modulator and/or an RF combiner. The cable network 400 provides for individual coaxial cables to provide communication capability from the cable head end 410 to individual set top boxes 430A-430H, where each set top box is located within a customer premises 440A-440H, such as, but not limited to, a home.

Figure 5:
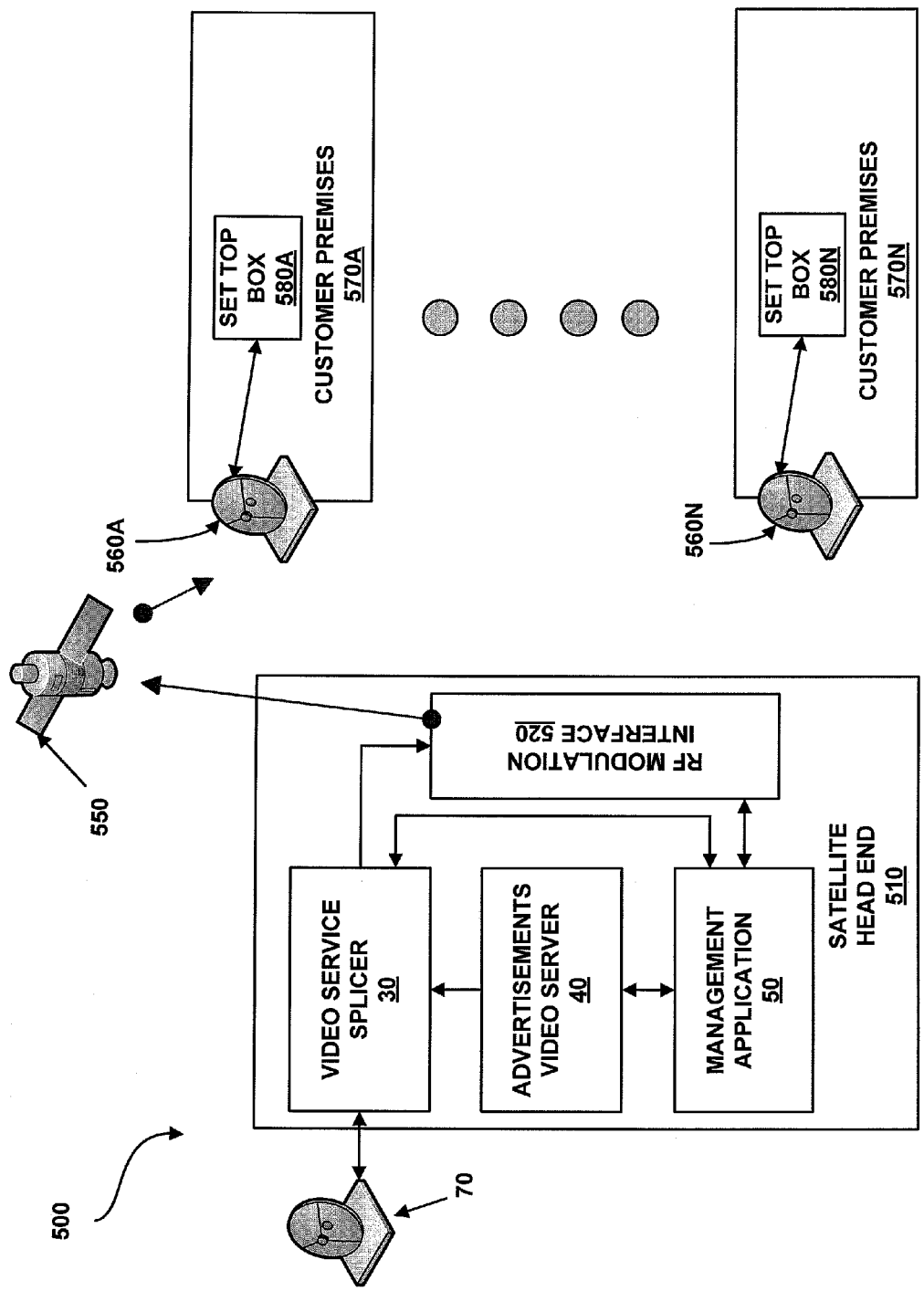
FIG. 5 is a schematic diagram illustrating an example of a satellite network in which the present system may be provided.

Another example of a network in which the present system and method may be provided is a satellite network. FIG. 5 is a schematic diagram illustrating an example of a satellite network 500 in which the present system may be provided. The satellite network 500 contains a satellite head end 510 that is similar to the IPTV head end 20, except that the satellite head end 510 contains an RF modulation interface 520. The RF modulation interface 520 is capable of formatting and amplifying received data for transmission to a satellite 550.

The satellite 550 is capable of reflecting received data to satellite dishes 560A-560N capable of receiving data signals from the satellite 550. Each satellite dish 560A-560N is associated with a customer premises 570A-570N, such as, for example, a home. In addition, each customer premises 570A-570N has at least one set top box 580A-580N located therein.

Figure 6:
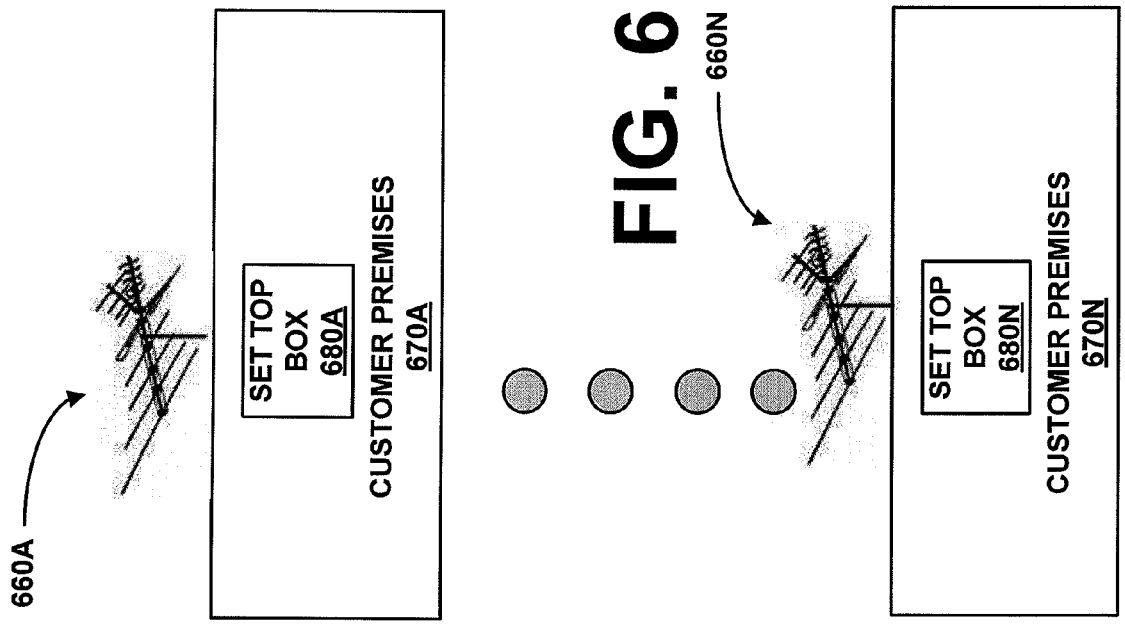
FIG. 6 is a schematic diagram illustrating an example of a terrestrial network in which the present system may be provided.
Figure 6:
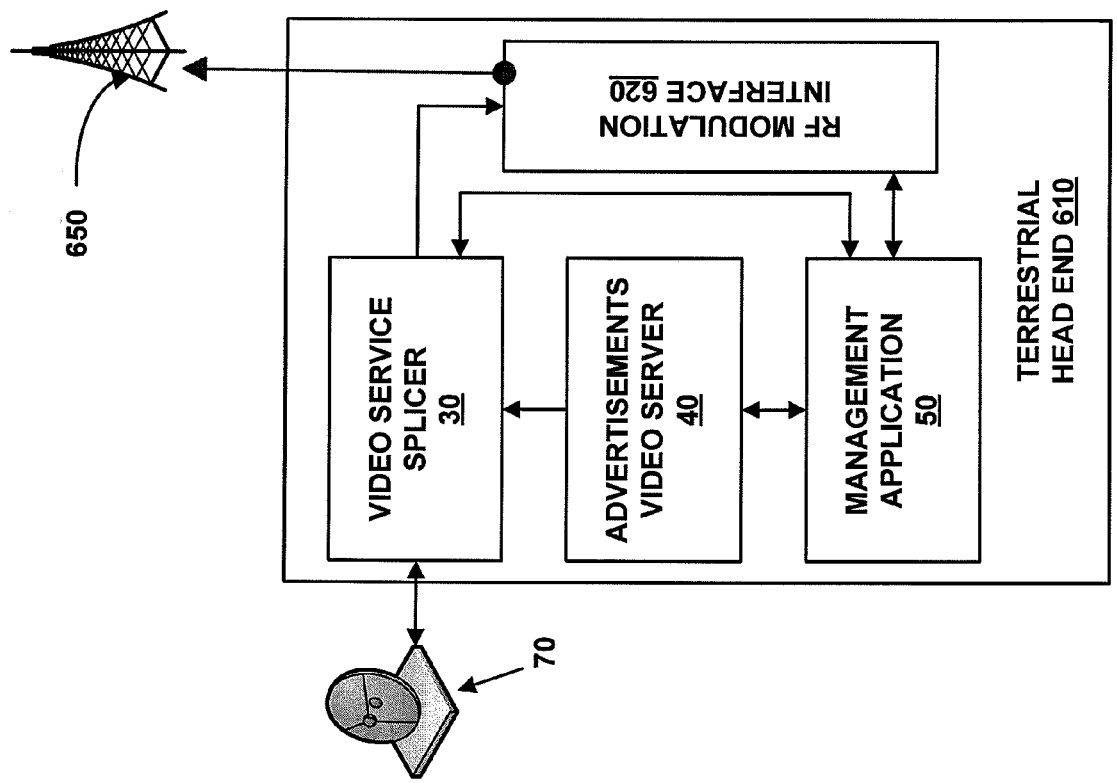

Still a further example of a network in which the present system and method may be provided is a terrestrial network. FIG. 6 is a schematic diagram illustrating an example of a terrestrial network 600 in which the present system may be provided. The terrestrial network 600 contains a terrestrial head end 610 that is similar to the IPTV head end 20, except that the terrestrial head end 610 contains an RF modulation interface 620. The RF modulation interface 620 is capable of formatting and amplifying received data for transmission to a radio tower 650.

The radio tower 650 is capable of reflecting received data to antennas 660A-660N capable of receiving data signals from the radio tower 650. Each antenna 660A-660N is associated with a customer premises 670A-670N, such as, for example, a home. In addition, each customer premises 670A-670N has at least one set top box 680A-680N located therein.

In accordance with the present invention, the management application 50 identifies the consumer profiles that are using video/audio decoders (i.e., set top boxes) in the network 10. For exemplary purposes the example of a single household having two television sets is provided. Each television is connected to a different set top box. A first television A is located in the living room and a second television B resides in a room for children.

In accordance with the present example, there are three consumer demographic profiles in the household, namely:
1. Profile 1: Male adult of age 37
2. Profile 2: Female adult of age 34
3. Profile 3: Male child of age 8 and male child of age 10

The consumer profiles are associated with the television sets as follows:

Television A—profiles 1, 2, and 3 (all the household residents are consuming content via television A).

Television B—profile 3 (only the children are using television B)

The process of identifying and associating consumer profiles to set top boxes may be separated in accordance with whether a supervised learning process is used or an unsupervised learning process. These two scenarios are described separately hereinbelow, although it will be noted that certain steps in the processes are similar.

In accordance with the present example, for both the supervised and unsupervised scenarios, service providers have no knowledge of the profiles existing in the household, the location of the television sets in the household, and/or associations between the television sets and the profiles. Instead, the management application 50 identifies and associates the consumer profiles with the set top boxes.

Supervised Learning

Figure 3:
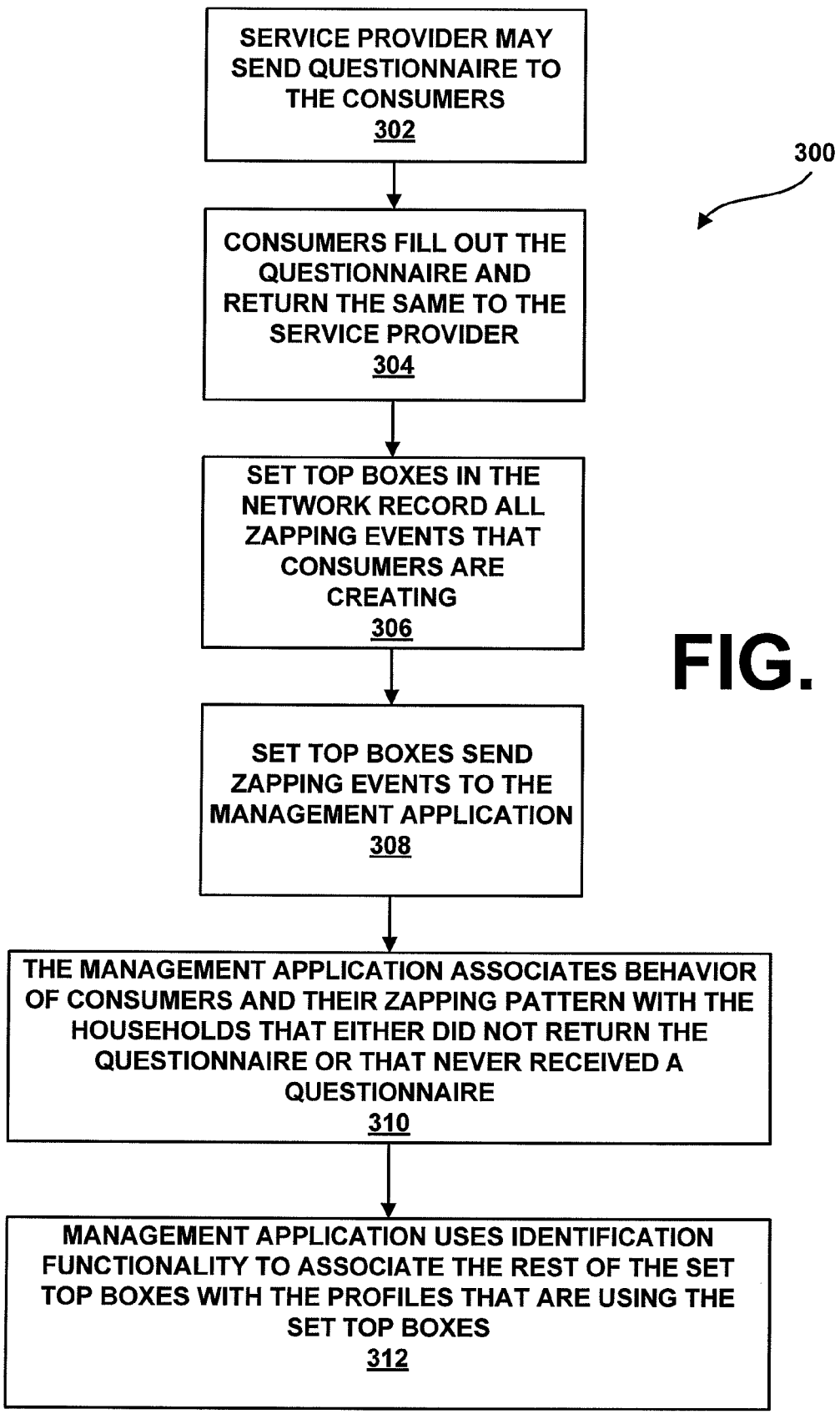
FIG. 3 is a flow chart further illustrating the process of identifying and associating consumer profiles to set top boxes within a supervised learning scenario.

Reference is now made to the flowchart 300 of FIG. 3. The flowchart 300 of FIG. 3 further illustrates the process of identifying and associating consumer profiles to set top boxes 100A-100D within a supervised learning scenario. As shown by block 302, to acquire a sample, the service provider may send a questionnaire to the consumers. Alternatively, the service provider may use any other method of obtaining data, such as, but not limited to, having a telephone conversation. The questionnaire may refer to the household demographic details, video decoders (i.e., set top boxes), and association between the usage of each person in the household and the video decoders in the household. As shown by block 304, consumers fill out the questionnaire and return the same to the service provider. With the return of the consumer questionnaire, it is known which individual profiles and set top boxes are associated with a household.

As shown by block 306, set top boxes 110 in the network 10 record all of the zapping events that the consumers are creating. In accordance with the present description, and as is known by those having ordinary skill in the art, zapping refers to the switching from the current service to another service via use of, for example, but not limited to, a remote control or pushing buttons on the video decoder. It should be noted that this use of remote controls is provided for exemplary purposes. Instead, zapping may be associated with switching initiated by voice commands, or even consumer motions without pressing buttons.

As shown by block 308, the set top boxes 110 send the zapping events to the management application 50. The management application 50 then associates behavior of consumers and their zapping pattern with the households that either did not return the questionnaire or that never received a questionnaire (block 310).

Figure 7:
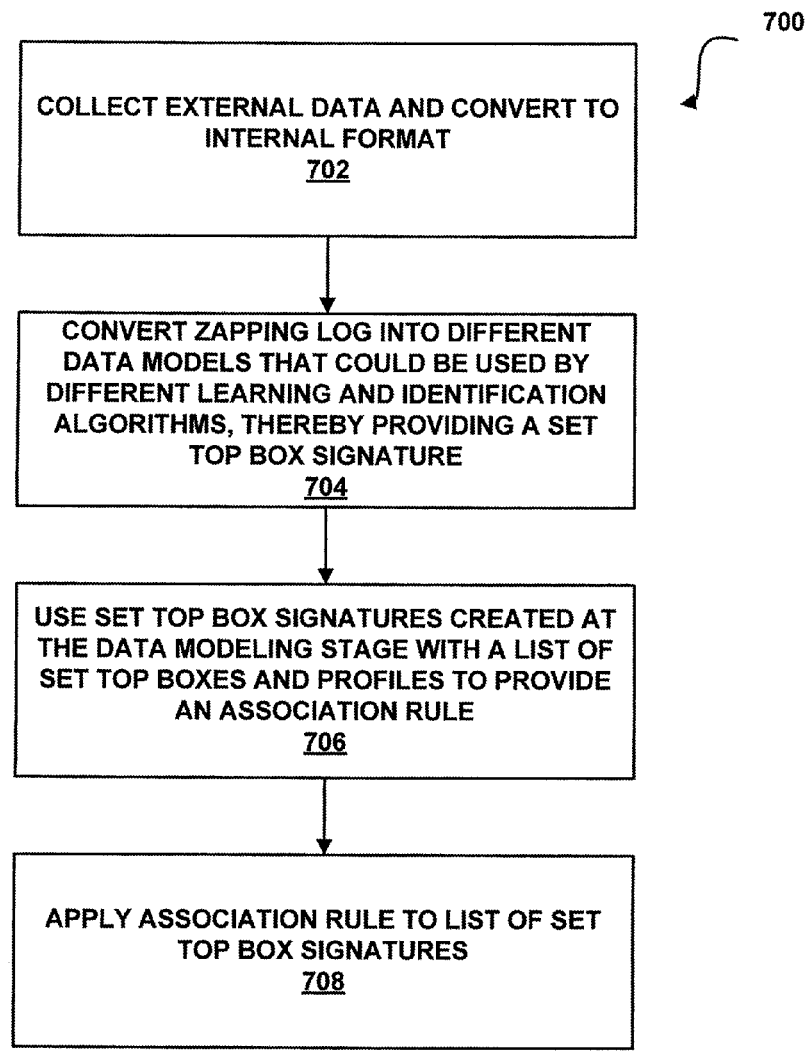
FIG. 7 is a flow chart further illustrating the steps of the supervised learning process.

The association process is a learning process, also referred to as a business process, which is the process of passive platform audience learning and identification, and targeted platform rating calculation and analysis. The learning process is divided into multiple steps, including data collection, modeling, learning, identification, analysis, and post processing. FIG. 7 is a flow chart 700 further illustrating the steps of the supervised learning process.

Data Collection

Referring to the step of data collection, in order to perform audience learning, audience identification, and targeted rating calculation, certain external data is collected and converted into an internal format (block 702). This external data includes the zapping log, the broadcast schedule, set top box information, and sample information. The zapping log includes the actions that were performed by the set top box user using a remote control, directly using set top box control buttons, or performing a different action that caused changing from a current service to another service, or from a current state of the set top box to another state of the set top box (e.g., switching on or off). The broadcast schedule (or AsRun) includes a timetable for the platform channels/programs during the zapping gathering period. The broadcast schedule should be reconciled with the zapping log in terms of times and channels identifications. The set top box information includes the relevant information, for every set top box for which zapping was collected, (e.g., unique set top box identifier and address). The set top box information should also be reconciled with the zapping log in terms of set top box identifications.

Modeling

Modeling is the process of converting the zapping log into different data models that could be used by different learning and identification algorithms, thereby providing a set top box signature (block 704). In accordance with the present system and method, at least the following data models are recognized. A first data model that is recognized is a set top box viewing signature. Regarding the set top box viewing signature, for each set top box, the list of "watched" programs could be created based on the zapping log and reconciled broadcast schedule. For each watched program, an aggregated watching percentage is given. As an example, STB1 watched program number 56, 30%, means that STB1 watched 30% of the program, on overall (including leaving the program and getting back to it), during the whole time of broadcast of program number 56. A second data model that is recognized is a set top box time signature. The set top box time signature is, for each set top box, the list of percentages of viewing every channel during the specific time aggregated for weekdays. As an example, set top box 1 (STB1) watched CNN on Sundays between 12:00 and 13:00, 25%, means that during the learning period, the average time that this particular set top box watched CNN between 12:00 and 13:00 on Sundays was fifteen minutes.

A third data model that is recognized is a set top box zapping frequency signature. Specifically, every profile does zapping with different frequencies. Calculating zapping frequencies of every set top box during the predefined time periods provides a Zapping Frequency Signature.

Unfortunately, the zapping data is not noise free. Most of the viewers use the remote control in the same fashion, but there is a small minority of users that would use the remote control differently. This affects the general zapping frequency, surfing periods (when the viewer changes the channels with high frequency in order to find something interesting), etc. In order to handle these irregular behaviors, a set of data filters should be applied to the zapping log prior to modeling.

Learning

For supervised learning, learning is a process in which the set top box signatures (viewing, time, and/or zapping frequency), created at the data modeling stage, are used with a list of set top boxes and profiles to provide an Association Rule (block 706). The Association Rule provides knowledge of how to associate a list of profiles within a network to a set top box within the network. The Association Rule is determined due to not having received filled out questionnaires from all parties and wanting to determine unknown relationships between profiles and set top boxes.

It should be noted that during supervised learning, it is not determined which profiles are associated with which set top boxes. Instead, as mentioned above, an Association Rule is determined to provide knowledge of how to associate a list of profiles to each set top box.

As mentioned above, during supervised learning there is an association of set top box signatures (e.g., viewing) for each set top box in the data model to a predefined list of profiles, based on a sample, for further use in the identification functionality. A sample is a partial list of set top boxes for which both the zapping log and the list of profiles associated with each set top box are provided. The sample is provided by an operator of the set top box collection. Predefined profiles can be, for example, but not limited to, demographic profiles that define gender, age, marital status, income level, or psychographic (behavioral) profiles.

The Association Rule can be applied to any set top box in the same network, as is performed during identification. An example of a process that may be used to derive the Association Rule follows. The management application 50 contains knowledge of the current consumed service for a specific decoder, the profiles (demographic, or behavioral) associated with a specific decoder and household, and previously consumed content for a specific decoder. In accordance with the present invention, the management application 50 uses inference functionality to determine the current viewer/listener profile. The inference functionality defines the current profile(s) that is/are consuming the service.

An example of inference functionality follows, where the learning functionality uses Bayes rule. At this point, the management application 50 contains knowledge of the current consumed service for a specific decoder (set top box). In addition, the management application 50 knows the demographic profiles associated with a specific decoder and household. Further, the management application 50 knows previously consumed content for a specific decoder, specifically, the short-term history. The management application 50 may then use the inference functionality to determine the current viewer/listener profile.

An example for the inference functionality using Bayes rule is provided hereinafter. In the learning algorithm, data collection determines the distribution of the consumed content as a function of the classification of the viewers/listeners at the household. In addition, using the data in conjunction with the Bayes rule, the probability that the household contains a viewer/listener belonging to each demographic profile is estimated. Data utilized to perform this process includes probabilities of each consumed service for households containing each of the demographic profiles, as well as probabilities of each consumed service for households not containing each of the demographic profiles.

Bayes rule reads as shown by equation 1 below.

$$P(C|F1 \ldots Fn) = P(F1 \ldots Fn|C)*P(C)/(P(F1 \ldots Fn|C)*P(C) + P(F1 \ldots Fn|\sim C)*P(\sim C)) \quad \text{(Eq. 1)}$$

In equation 1, P (F1 . . . Fn|C) is the probability that a household containing a certain profile (C) consumes the list of services F1 . . . Fn and does not consume any other service. In addition, P (F1 . . . Fn|~C) is the probability that a household not containing a certain profile (C) consumes the list of services F1 . . . Fn and does not consume any other service. Further, P(C) is the probability that a household contains profile C, regardless of the services consumed and P(~C) is the probability that a household does not contain profile C, regardless of the services consumed.

P(F1 . . . Fn|C) and P(F1 . . . Fn|~C) may be approximated as the products P(F1|C)* . . . *P(Fn|C) and P(F1|~C)* . . . *P(Fn|~C) respectively, which may be calculated directly from the statistics gathered for the sample population. Better approximations may be obtained by considering correlations between services and between profiles in a household. From the above calculation, the result is the probability, P(C|F1 . . . Fn) that a household contains profile C, given the list of the household consumed services. The collection of all values P(C|F1 . . . Fn), calculated for the whole of sample set top boxes represents the Association Rule used for the identification step, applied to each set top box in the network, which was not part of the sample set top boxes. In addition, from this calculation, the result is the probability that a certain demographic profile consumes the service in this household.

In accordance with an alternative embodiment of the invention, a sample may be provided, and post processing may be provided to associate content with profiles. Specifically, a sample may include at least one profile, a set top box associated with the profile, and zapping information associated with the set top box. Post processing may then be performed on the sample to determine which content (e.g., advertisement) is most appropriate for providing to the consumer associate with the profile. As a result, in accordance with this alternative embodiment of the invention, the learning process is not required.

Identification

Identification is a process of recognition of a list of profiles as being associated with a certain set top box (STB), based on the learning results. Every set top box in the network should be assigned with at least one profile (demographic, or behavioral). It is conceivable to assume that in front of a set top box, mostly there is more than one active profile and there are cases where the same profile should be associated a few times to the same set top box. Thus, for each set top box there should be assigned one or more profiles. For example, a young couple (male & female) between the ages of 20-30 that are living together would produce 2 profiles, specifically, one for the female and the other for the male. As another example, if a specific household has two boys of the ages seven and fourteen, the boys may both be assigned to an appropriate set top box as the same profile, "Male 6-18."

To determine the list of profiles associated with a set top box, the Association Rule is mathematically applied to the list of set top box signatures (block 708).

Analysis

Analysis is the process of breaking down and studying the results of learning and identification in order to estimate possible identification errors, provide a set of different factors and amendments for post processing, association of definition of profiles by signatures to a third party definition, and any other functionality resulting from studying the learning and identification results.

The identification error analysis may be performed via mathematical modeling means and/or via simulation (empirical) means. For example, estimation of expected identification errors may be achieved via applying the learned results to a part of the sample and simulating the identification results.

Post Processing

Post Processing is the process of calculating the data required for presentation to potential customers, such as, targeted rating. Post processing also includes reporting and analyzing based on results of identification. The aforementioned list of results is obtained via post processing functionality described hereafter. Such functionality may be provided by, for example, algorithms. Post processing may be utilized to calculate the following data, although post processing calculation is not intended to be limited to calculating only this data; rather, by post processing any calculation done with the use of the results obtained from the learner and/or identifier is referred to as a post processed calculation/algorithm.

Targeted Rating

The targeted rating of a program per profile may be calculated (e.g., using optimization algorithms, see example hereinbelow) of the learned and identified data, or of any independent data (e.g., obtained only from the sample) as long as it contains information about the set top box signatures (e.g., viewing signatures) and the profile(s) associated to each set top box in the input. The output of the targeted rating functionality is the percentage of each pre-defined profile that watched each of the programs in the aggregation of the viewing signatures (see an example table below). An example of a method to calculate targeted rating given a list of set top boxes with viewing signatures and profile(s) associated to each one of them can be given via the use of a linear regression optimization algorithm: assuming that multiplying the set of parameters representing the association of profile(s) to set top boxes (let us call it A) by the aggregation of targeted rating probabilities of each of the profiles per each program watched by any set top box (the yet unknown and desired output, let us call it B) corresponds to the parameters representing the aggregation of the set top boxes viewing signatures (part of the input, let us call it C), a minimization algorithm on the squared difference of $$(A*B-C) \quad \text{(Eq. 2)}$$

is then performed (a random initial guess is provided to the algorithm for the values of B). In other words, given A and C, the output of applying this algorithm is the set of probabilities, B, representing the probability of each profile to watch each of the programs broadcasted to the collection of set top boxes. An example table for such an output is presented below:

If the pre-defined profiles are:
1. Female of age 30-55 with high income.
2. Male of age 18-40 with average income.
3. Male child of age 6-16 with low income.
4. Female child of age 6-16 with average income.

And the list of programs (as specified in the viewing signatures) is:
1. Saturday night live.
2. Lost.
3. 24.

Then the targeted rating (TR) output would be the following table:

| Program ID | Profile ID | Rating (in % of each profile) |
|---|---|---|
| 1 | 1 | 0.5% |
|   | 2 | 1% |
|   | 3 | 0.01% |
|   | 4 | 0.04% |
| 2 | 1 | 3% |
|   | 2 | 1.54% |
|   | 3 | 0.01% |
|   | 4 | 0 |
| 3 | 1 | 2.31% |
|   | 2 | 2.11% |
|   | 3 | 0 |
|   | 4 | 0 |

Profile to Program Assignment

In addition to a targeted rating of a program per profile, a program to profile assignment may be determined. Obtaining a program to profile assignment involves determining for each program that was watched by a certain set top box, which is the specific profile, of the profiles associated to this set top box, that watched the program. This can be done, for example, via use of algorithms applying algebraic manipulations to the sets of parameters representing the aggregation of viewing (or other) signatures of the set top boxes (such as C above), the parameters representing the association of profile(s) to set top boxes (e.g., A above) and parameters representing targeted rating probabilities (e.g., B above).

Total Viewership

Further, a total viewership may be calculated (using, e.g., a program-time slot map and applying to it a calculation algorithm which utilizes data obtained in the previous steps described here), which is the calculation of total aggregated viewing activities for each of the pre-defined profiles (these may be demographic or behavioral), during a twenty-four hours period for each week day.

For example, having the association of profile(s) with each set top box, represented as a set of probabilities (either obtained as an output from the learning and identification steps or given from an outside source), and given the set top box signatures (e.g., as an output from the data modeling stage), given in addition the broadcasting time table (showing for a pre-defined period of time at which time and date and for which duration each program was broadcasted), the following calculation is performed.

The data is aggregated and modulated in such a form that for each day of the week (24 hours) it is calculated how many of each of the pre-defined profiles watched any content during each of the pre-defined time intervals. For example, if the period decided upon is three months and there were 12 Sundays during this period, the 24 hour period is divided to intervals of 15 minutes and for each such interval it is calculated (using the set top box signatures and the data mentioned above) how many times each of the pre-defined profiles watched any content during each of the 15 minute intervals aggregated for all 12 Sundays on a 24 hours span. Then this information is presented in a graph showing the viewing peaks during a 24 hour Sunday divided to 15-minute slots per each profile. This is done for each day of the week (aggregated to the number of time this weekday appeared during the three months period).

In addition to the abovementioned, a targeted rating distribution may be determined, which involves, for every channel, for every profile, calculating the rating of the channel for every brief period of time (e.g., thirty seconds), for every minimally defined region. Further, a viewership flow may be determined, which includes, for every channel, calculating the number (or percentage) of viewers of every profile that join and leave the channel during every short period of time (e.g., thirty seconds), for every minimally defined region. Still further, creative reports may be determined such as, for example, during an advertisement break, for each second, calculating the rating and viewership flow. All the aforementioned are merely examples of the post processing possibilities.

In the supervised case, with the knowledge gained by the functionality of block 310, for any households that did not fill out the questionnaire, the management application 50 uses identification functionality to associate the rest of the set top boxes 110 with the profiles that are using the set top boxes 110 (block 312). An example of the functionality, which is used as a basis for such an identification functionality, is provided herein below. It should be noted that different relevant learning methods may be used to perform the identification functionality. Examples of such learning methods may include the use of any one of the following, or other learning methods: Bayesian learning, various statistical methods, artificial neural networks; decision trees; k-nearest neighbor; quadratic classifier; support vector machine; various optimization methods, and direct calculation of probabilities. Of course, other learning methods may be used and are intended to be included within the present description.

Unsupervised Learning

Figure 8:
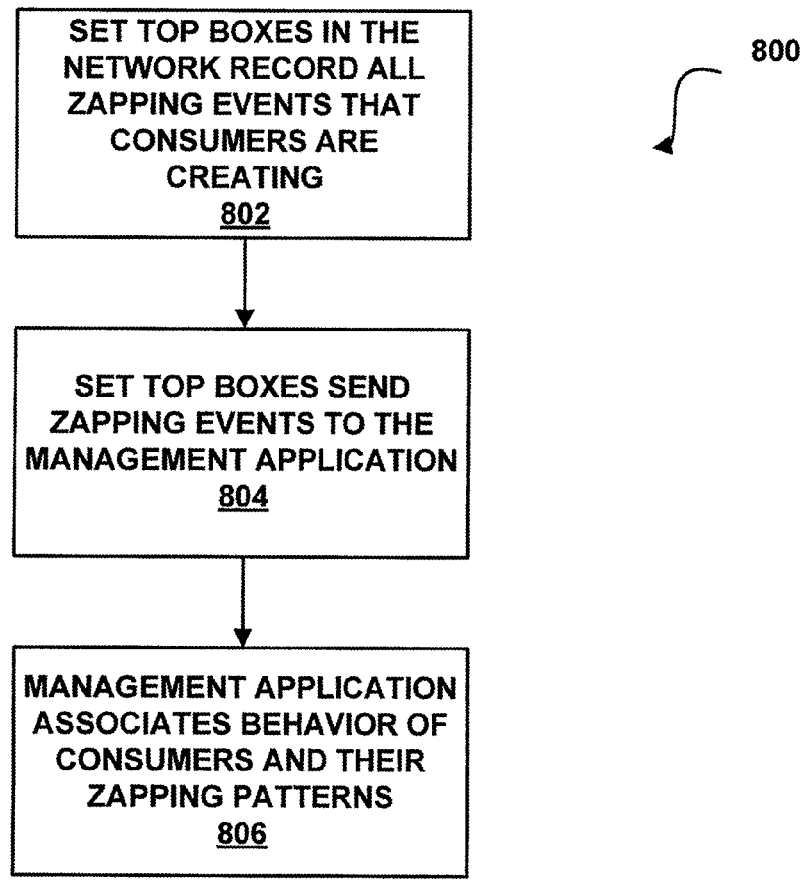
FIG. 8 is a flow chart further illustrating the process of identifying and associating consumer profiles to set top boxes within an unsupervised learning scenario.

Reference is now made to the flowchart 800 of FIG. 8. The flowchart 800 of FIG. 8 further illustrates the process of identifying and associating consumer profiles to set top boxes 100A-100D within an unsupervised learning scenario. It should be noted, that unlike with supervised learning, with unsupervised learning no viewer profiles are provided. As a result, the viewer profiles must be determined. To determine viewer profiles one of many methods may be used, such as, but not limited to, using clustering algorithms to find common denominators within a population in association with viewing habits of the population.

As shown by block 802, set top boxes 110 in the network 10 are recording all of the zapping events that the consumers are creating. The set top boxes 110 send the zapping events to the management application 50 (block 804). It should be noted that the zapping events include an identification of the set top box from which the zapping events were derived. The management application 50 then associates behavior of consumers and their zapping patterns (block 806).

As with the supervised scenario, the association process, also referred to as the learning process, is divided into multiple steps, including data collection, modeling, learning, identification, analysis, and post processing. Of the multiple steps, only the learning process differs between the supervised and unsupervised scenarios. As a result, the learning process is defined hereinabelow.

Learning

For unsupervised learning, each set top box signature is learned to be associated with a certain list of profiles defined using the signatures. No sample is provided in this case. An unsupervised learning algorithm receives the set top box signatures as an input, resulting in a classification of profiles into psychographic (behavioral) or demographic groups. Examples of unsupervised learning algorithms include, but are not limited to, least squares algorithms and algorithms that provide minimization via steepest decent. Other outputs from the learning algorithms include an association of profiles to set top boxes and obtaining a targeted rating of the defined profiles.

The following is provided as an example of an unsupervised learning algorithm. Considering Eq. 2 above with the same meaning of A, B and C, an input to the unsupervised learning process is the collection of set top box signatures, which is the output of the data modeling process. Assume as an example that these are viewing signatures (although these might be time signatures, etc.), where we denote their parametrical representation by C (as in Eq. 2). The parameter collection representing profiles associated to each set top box, A, and the targeted rating probabilities, denoted by B, are unknown in this case. We then minimize the squared difference (A*B−C) using, for example, a convex optimization algorithm under various constrains, such as, but not limited to, that each quantity in A is greater than zero and smaller than one, and each quantity in B is greater than zero and smaller than e.g., 0.5.

An initial random guess is given to the algorithm for any of the probabilistic quantities in A and B. Additional constrains may be given to the algorithm to increase its accuracy. Of course, other optimization (or learning) algorithms may be used. The output is a set of probabilities, A, associating groups of profiles to the set top boxes, which later is to be resolved using a profile resolving procedure, and the set of probabilities, B, providing the targeted rating for each program and each profile (also to be used in the profile resolving scheme).

Profile resolving is a process that defines the nature of identified profiles. During profile resolving, single source research results, such as, but not limited to, viewing habits and behavior, may be used as inputs. In addition, the profile list and targeted rating of defined profiles may be used as inputs. The inputs are provided to a resolving algorithm resulting in profile descriptions that describe each profile in the list.

The single source research addresses a focus group that answers a questionnaire. There are two groups of questions in this questionnaire, namely, a first group and a second group. The first group refers to identity of a person, examples including behavior (i.e., purchasing behavior, R&R preferences, etc) and demographic profile of the answering person. The second group refers to media consumption, for example, about the time a person would watch TV each day of the week and his preferred shows.

The single source research associates the media consumption habits with other habits, such as, but not limited to, purchasing habits and preferred vacation habits. The output of the single source research is a set of profiles and their habits, while each profile is associated with its media consumption habits. The resolving algorithm finds the best correlation between two sets of data, namely, the media consumption habits of the focus group; and the targeted rating of the defined profiles (the output of the unsupervised learning algorithm). Thus the resolving algorithm has the capability to define the traits of the learned profile in the unsupervised algorithm In accordance with the present invention, the management application 50 knows online the current demographic profiles that are consuming content for each and every set top box 110 in the network 10. The information regarding the current demographic profiles that are consuming content for each and every set top box is the basis for personalized advertisements deployment in accordance with the present invention.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A method of performing supervised learning to associate one or more consumer profiles within a video audience with one or more video decoders within a network, comprising the steps of:

obtaining consumer profile data for a subset of consumer households, wherein the consumer profile data for each consumer household includes information associating one or more consumers in the consumer household to one or more video decoders in the consumer household based on which consumers in the consumer household use each of the one or more video decoders;

receiving zapping events recorded from at least one video decoder, within said network, also referred to as zapping patterns, wherein said zapping events are for a given time period;

receiving data from questionnaires providing an association of at least one consumer profile of said one or more consumer profiles to one or more video decoders for which said zapping events were recorded, wherein said received data serves as profile data;

using statistical analysis on said received profile data that provides an association of at least one consumer profile of said one or more consumer profiles to one or more video decoders for which said zapping events were recorded to infer a relation between one or more of the zapping patterns and at least one of the consumer profiles of said one or more consumer profiles that is associated with one of the video decoders; and determining, based on the inferred relation, said received data and said received zapping events, a set of consumer profiles associated with one or more of the video decoders for which no consumer profile data was obtained; and determining a probability that each consumer profile in said set of consumer profiles has been using said one or more of the video decoders for which no profile data was received from questionnaires during a time period represented in said zapping events recorded.

2. The method of claim 1, wherein obtaining the consumer profile data for the subset of consumers in the video audience comprises:
providing questionnaires to one or more of the consumers; and
receiving at least some of said questionnaires filled out by the one or more of the consumers.

3. The method of claim 1, wherein said zapping events include events where there is a switching from a current service to another service and/or other system for communicating with the one or more video decoders for which the zapping events were received.

4. The method of claim 1, wherein some or all of the video decoders are set top boxes.

5. The method of claim 4, wherein said external data is selected from the group consisting of a zapping log, a broadcast schedule, set top box information, and sample information.

6. The method of claim 4, wherein obtaining the consumer profile data for the subset of consumers in the video audience comprises:
providing questionnaires to one or more of the consumers; and
receiving at least some of the provided questionnaires filled out by said one or more of the consumers.

7. The method of claim 6, further comprising the step of, for any households that did not fill out the questionnaire, using identification functionality to associate set top boxes to remaining consumer profiles, that were not associated via use of said association rule.

8. The method of claim 1, further comprising the step of determining a targeted rating of a program per consumer profile.

9. The method of claim 1, further comprising the step of determining a total viewership.

10. The method of claim 1, further comprising the step of determining a viewership flow.

11. The method of claim 10, wherein the step of determining a viewership flow further comprises the steps of, for each channel made available by the video decoders, calculating a number, or percentage, of viewers of every consumer profile that join the channel and leave the channel during a short period of time.

12. The method of claim 11, wherein the step of determining a viewership flow is performed for every minimally defined region.

13. The method of claim 1, further comprising the step of determining a targeted rating distribution.

14. The method of claim 13, wherein the step of determining a targeted rating distribution further comprises the steps of, for every channel made available by the video decoders, for every consumer profile, calculating a rating of the channel during a short period of time.

15. The method of claim 14, wherein the step of determining a targeted rating distribution is performed for every minimally defined region.

16. The method of claim 1, wherein received data includes data associating consumer profiles and video decoders to households within said network, and wherein said method further comprises the step of associating at least one viewer profile to at least one household.

17. The method of claim 1 wherein a household is associated with one or more video decoders within said network.

18. The method of claim 1, further comprising the step of determining content to a viewer profile association.

19. The method of claim 18, wherein determining content to a viewer profile association includes associating at least one consumer profile to a pre-defined content, wherein the profile is associated to at least one of the video decoders within said network.

20. The method of claim 1, where the zapping patterns are aggregated over all video decoders in a specific facility, and are used to determine all consumer profiles associated with this facility, 21. The method of claim 20, wherein the received data, the received consumer profiles, and the determined set of consumer profiles are used to determine a probability that each individual consumer profile using a video decoder was viewing a specific content during the given time period of the zapping events.

22. The method of claim 1, wherein the received data, the received consumer profiles, and the determined set of consumer profiles are used to determine a probability that each individual consumer profile using a video decoder was viewing a specific content during the given time period of the zapping events.

23. A system for providing supervised learning to associate one or more consumer profiles within a video audience with one or more video decoders within a home network, wherein consumer profile data is obtained for a subset of consumers in the video audience and the consumer profile data for each consumer is associated with one or more of the video decoders in the home network, the system comprising:

logic to receive zapping events recorded from at least one video decoder, within said home network, also referred to as zapping patterns, wherein said zapping events are for a given time period;

logic to receive data providing an association of at least one of the consumer profile of said one or more consumer profiles to one or more of the video decoders for which said zapping events were recorded, wherein said received data serves as profile information; and logic to use statistical analysis on the received data to infer a relation between one or more of the zapping patterns and at least one consumer profile of said one or more consumer profiles that is associated with one of the video decoders within the home network; and determining from said received data and said received zapping patterns, a set of consumer profiles associated with one or more of said video decoders for which no consumer profile data was obtained from said received data; and determining a probability that each consumer profile in said set of consumer profiles has been using said one or more video decoders during a time period represented in said zapping pattern, further comprising a management application that comprises:
- logic to convert a format of external data into an internal format;
- logic to convert zapping logs into different data models that can be used to provide set top box signatures;
- logic to provide said set top box signatures;
- logic to use said set top box signatures with a list of set top boxes and of said one or more consumer profiles to provide an association rule; and
- logic to apply said association rule to said set top box signatures to determine a list of profiles of said one or more consumer profiles associated with a specific set top box of said set top boxes.

24. The system of claim 23, further comprising:
a head end selected from the group consisting of an internet protocol television head end, a cable head end, a satellite head end, and a terrestrial head end.

25. The system of claim 23, further comprising:
a system for communicating selected from the group consisting of an access network multiplexer, a radio frequency interface, and a radio frequency modulation interface.

26. The system of claim 23, wherein said zapping patterns include events where there is a switching from a current service to another service and/or other system for communicating with a set top box.

27. The system of claim 23, wherein said external data is selected from the group consisting of a zapping log, a broadcast schedule, set top box information, and sample information.

28. The system of claim 23, wherein said management application further comprises logic configured to determine a targeted rating of a content per consumer profile.

29. The method of claim 28, wherein the content is a program.

* * * * *